(12) United States Patent
Han et al.

(10) Patent No.: US 7,082,683 B2
(45) Date of Patent: Aug. 1, 2006

(54) METHOD FOR ATTACHING ROD-SHAPED NANO STRUCTURE TO PROBE HOLDER

(75) Inventors: Chang Soo Han, Daejeon (KR); Eung Sug Lee, Daejeon (KR); Hyung-Woo Lee, Busan (KR)

(73) Assignee: Korea Institute of Machinery & Materials, Daejoeon (KR)

( * ) Notice: Subject to any disclaimer, the term of this patent is extended or adjusted under 35 U.S.C. 154(b) by 290 days.

(21) Appl. No.: 10/651,612

(22) Filed: Aug. 28, 2003

(65) Prior Publication Data
US 2004/0211271 A1 Oct. 28, 2004

(30) Foreign Application Priority Data
Apr. 24, 2003 (KR) .................. 10-2003-0025948
Jun. 2, 2003 (KR) .................. 10-2003-0035429

(51) Int. Cl.
*H01R 43/16* (2006.01)

(52) U.S. Cl. .................. 29/874; 29/592.1; 29/825; 73/105; 250/306; 324/158.1; 324/754; 977/DIG. 1

(58) Field of Classification Search ............... 29/592.1, 29/825, 830, 832, 840, 874, 875–879; 73/105, 73/866.5, 104; 205/67, 109; 250/307, 310, 250/306; 324/158.1, 261, 754, 761; 423/447.1; 436/171; 438/607
See application file for complete search history.

(56) References Cited

U.S. PATENT DOCUMENTS

| 6,528,785 | B1 * | 3/2003 | Nakayama et al. | 250/306 |
| 6,759,653 | B1 * | 7/2004 | Nakayama et al. | 250/306 |
| 6,879,143 | B1 * | 4/2005 | Nagahara et al. | 324/71.1 |
| 6,892,432 | B1 * | 5/2005 | Nakayama et al. | 29/412 |
| 6,919,730 | B1 * | 7/2005 | Cole et al. | 324/715 |
| 2003/0102222 | A1 * | 6/2003 | Zhou et al. | 205/109 |

* cited by examiner

*Primary Examiner*—Minh Trinh
*Assistant Examiner*—Donghai D. Nguyen
(74) *Attorney, Agent, or Firm*—Sheridan Ross P.C.

(57) ABSTRACT

The present invention relates to a method for manufacturing a probe for detecting surface signals or chemical signals through a long and slender rod-shaped nano structure such as tungsten nanowire, carbon nanotube, boron nanotube, etc., being attached to a tip end portion thereof. According to the method, a holder, acting as the probe, including a first electrode to which the rod-shaped nano structure is attached, and a second electrode at a predetermined distance from the first electrode are partially or fully immersed in a solution containing the rod-shaped structure. When a voltage is applied between two electrodes, an electrical field is generated, and the rod-shaped nano structure is attached to the holder, acting as the probe.

9 Claims, 7 Drawing Sheets

METHOD FOR ATTACHING ROD-SHAPED NANO STRUCTURE TO PROBE HOLDER

BACKGROUND OF THE INVENTION

1. Field of the Invention

The present invention relates to a probe for signal detection having a rod-shaped nano structure attached thereto and a method for manufacturing the same, and more particularly, to a probe for detection of a surface signal or a chemical signal having a rod-shaped nano structure, such as tungsten nanowire, carbon nanotube, boron nanotube, etc., which is attached to an tip portion thereof and a method for manufacturing the same.

2. Description of the Related Art

Until recently, the nano world of atom or molecular unit was an unknown field as being too minute to be observed even by a microscope of a high resolution. With introduction of an SPM (scanning probe microscope) in 1980s, however, the nano world finally has become structurally identified. The first kind of atomic microscope such as the SPM was an STM (scanning tunneling microscope) while the most commonly used one is an AFM (atomic force microscope).

FIG. 1 shows a construction of the AFM in general. As shown in FIG. 1, the AFM has a tapered tip 10 of a pyramid shape formed at one end of a cantilever 12, a tiny rod (100 µm×10 µm×1 µm), which is produced by micromachining. When the tip 10 is approached to a surface of a sample 14, interactions (repulsion or attraction) occur between the tip 10 and atoms on the surface of the sample 14. The interactions comprise mainly Van Der Waals force and are of about a nano Newton level or less ($10^{-9}$ N). Because of such interactions, the cantilever 12 is bent or shows a change in resonance frequency when it moves over the surface of the sample 14. Thus, it is possible to determine a geometrical morphology of the sample by measuring the bend and the change in resonance frequency. Meanwhile, the bend and the change in resonance frequency of the cantilever 12 can be measured by using a laser 16 and a photodiode 18. At this stage, a feedback control is used to continuously keep the measurement on the surface, whereby a stage 20 having the cantilever 12 attached at its end can continuously measure the bend of the cantilever 12 while maintaining a uniform distance between the tip and the sample. Thus obtained results are analyzed to acquire surface information on the sample.

The AFM is used as a fundamental research equipment to measure or observe the nano level. The AFM is also used in various fields as process equipments for production at the nano level. The processing technologies using the AFM such as soft probe lithography or scanning probe lithography (SPL) are under intensive research and study recent days.

The most fundamental core technology of the AFM resides in the probe tip. The image resolution and reproducibility of the AFM are determined according to the shape and size of the probe tip.

In general, tip of the cantilever of the AFM is formed to have a pyramidically tapered shape. However, carbon nanotube (CNT) is recently attracting public attention because of its abundant advantageous characteristics. The CNT is attached to a tip of a pyramid to be used as a probe.

The tip of the AFM is advantageously made of a material atomically having a high aspect ratio and a high resilience. Seen from this perspective, the CNT tips are known to have ideal characteristics to improve performance of the AFM in terms of measurement, operation and production, e.g., excellent sharpness, a high aspect ratio, mechanical stiffness and resilience as well as readiness in adjustment of chemical components. In addition, the CNT tips have advantages in that they have a long life span and are preferably used to measure a deep and narrow-width structure. The CNT tips have a resolution as high as 1 nm or less.

However, it is very difficult to individually form a high quality carbon nanotube in a desired shape at a desired position. The conventional methods such as laser ablation or arc discharge serve to form a nanotube like an entangled skein of thread. It is very difficult to purify, separate and manipulate such an entangled nanotube so as to be attached to a single device.

For instance, Oshima et. al. disclosed in U.S. Pat. No. 5,482,601 a method of vapor depositing carbon nanotube by means of arc discharge, while Mandeville et al. disclosed in U.S. Pat. No. 5,500,200 a method of massively producing MWNT by using catalyst.

Even though such methods are effective for developing a new complex material by massively producing the carbon nanotube or carbon fibril, it is almost impossible to separate individual nanotube and precisely attach each one to a desired position, as stated above. Thus, it is inappropriate to mount a nanotube tip on the probe of the AFM as a commercial method.

Recently, Cheung et. al. developed a method of directly growing MWNT or SWNT by coating catalyst on a microgroove, which was manufactured on a silicon substrate by means of chemical vapor deposition (CVD) (Carbon Nanotube Tips Direct Growth by Chemical Vapor Deposition, PNAS, Chin Li Cheung et. al., Vol. 97, No. 8). According to this method, catalyst particles are coated on a silicon substrate so as to individually grow a probe tip of the AFM. Thereafter, a carbon nanotube is grown by using carbonic oxide gas of high temperature.

However, it is very difficult to attach catalyst particles to the tip of the silicon pyramid. The SWNT grown at the tip of the pyramid is sized 1 µm~20 µm. In fact, however, its size should approximately be 30 nm~100 nm to be attached to the AFM. Although discharging methods are used to reduce the size, they rarely succeed in precisely adjusting the size.

In particular, Dai disclosed in U.S. Pat. No. 6,401,526 a more effective method of manufacturing an AFM tip, to which a nanotube has been attached. According to this method, a liquid phase precursor is coated on the tip of the AFM, and the coated AFM is grown by the CVD method. Discharging process is performed to adjust size of the manufactured nanotube. Here, the liquid phase precursor comprises salts including metals, a long-chain molecular compound, and a solvent. Dai also suggested a method of simultaneously coating the precursor on the tips of a plurality of pyramids by means of micro contacting printing.

Another recently reported method is to coat the precursor on a wafer, onto which a massive amount of silicon pyramid for AFM is mounted, by means of spin coating. The precursor is removed from the wafer except on the pyramid by means of etching. A carbon nanotube is grown in the gas including carbon by means of the CVD method. (Wafer Scale Production of Carbon Nanotube Scanning Probe Tips for Atomic Force Microscopy, Applied Physics Letter, Vol. 80, No. 12, Erhan Yenilmez etc., 2002, March, 00.2225–2227).

However, all of these methods pose a problem in that coating the precursor exactly to a desired amount is very difficult primarily because of mechanical and chemical properties of the precursor.

Meanwhile, Nakayama et. al. disclosed in U.S. Pat. No. 6,528,785 a method for manufacturing an electrode (i.e. nanotube) on a holder by fusion welding. According to this method, a carbon nanotube is first positioned between two electrodes. Then approaching the holder close to the carbon nanotube until they are attached to each other, and by means of electron beam or coating film, the carbon nanotube (CNT) is firmly fastened to the holder.

Although there have been introduced a variety of methods for manufacturing coating films, basically all of the methods are directed to one technique that material for use in coating is not the one being coated. Rather, the coating film is formed by a chemical reaction between a gas-exposed nanotube and a holder.

Unfortunately however, the above coating method driven by a chemical reaction is unrealistic and thus, cannot be succeeded in reality. This is because a microscopically protruded nanotube can also be influenced of the chemical reaction, and the nanotube itself can be damaged during a work process.

Besides the above, the method by Nakayama et. al. has a very low yield, and thus, is not appropriate for mass production. First of all, it is almost impossible to visually confirm whether the carbon nanotube is firmly adhered to the holder. Also, because the manufacturing process is usually conducted on SEM (Scanning probe microscope), it takes a great deal of time. Even then, it only raises concerns about the possibility of nanotube getting damages during the process. Moreover, when a carbon nanotube, one of the nano structures like SWNT (Single Wall NanoTube), gets too small, it is difficult to confirm the carbon nanotube as a SEM, so the process also becomes out of control, making the assembly thereof virtually impossible.

SUMMARY OF THE INVENTION

It is, therefore, an object of the present invention to solve the foregoing problems by providing a probe, which is capable of detecting a surface signal or a chemical signal through a rod-shaped nano structure such as tungsten nanowire, carbon nanotube, boron nanotube and the like attached to a tip end portion of the probe, and can be easily manufactured by mass-production methods, and a method for attaching a rod-shaped nano structure to a probe holder. Compared to the related art, the method of the present invention has a very high success rate and a substantially reduced assembling time by reducing and simplifying a step for manufacturing a probe tip.

According to one aspect of the present invention, the method for manufacturing a probe for detecting mechanical, electrical and chemical signals having a rod-shaped nano structure attached thereto includes the steps of:

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
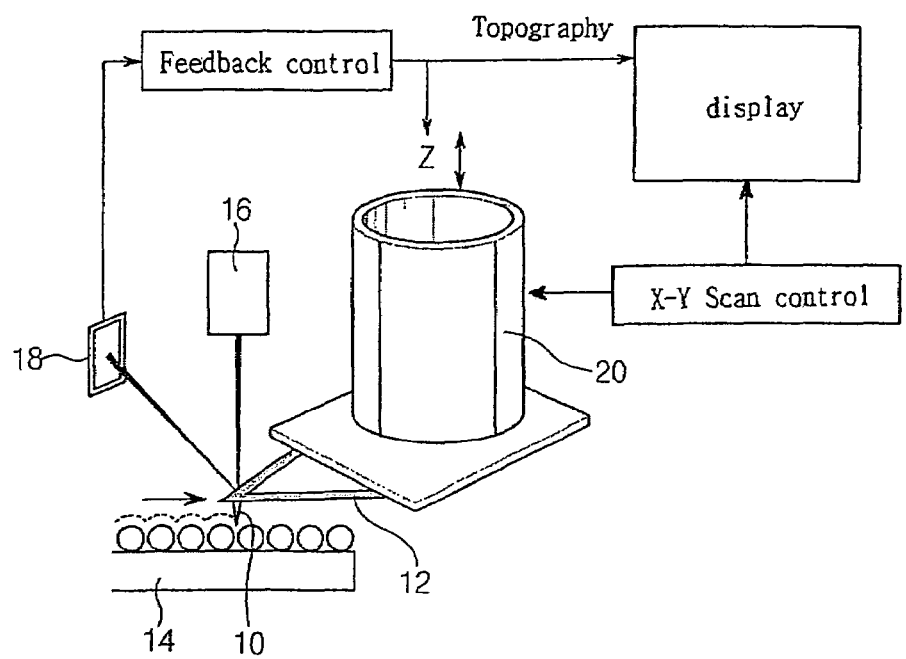
FIG. 1 is a schematic view illustrating a construction of a general AFM.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
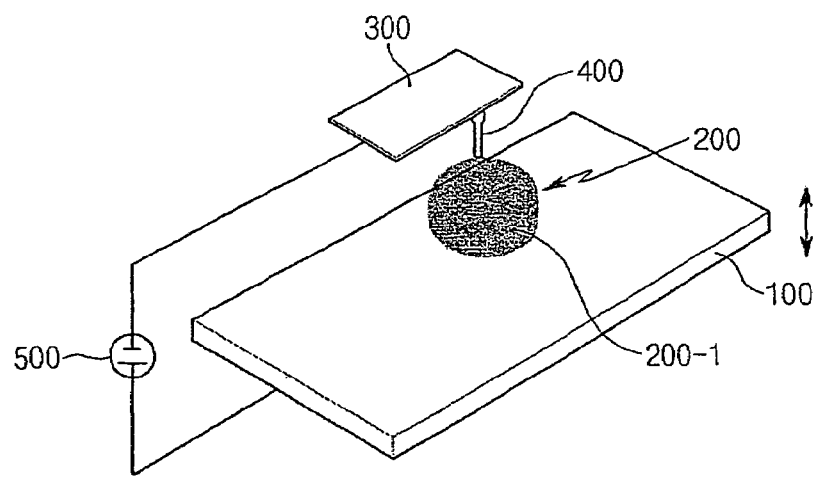
FIG. 2 is a view for explaining the method for producing a probe with a rod-shaped nano structure attached according to a first embodiment of the present invention.

FIG. 2 is a view for explaining the method for producing a probe with a rod-shaped nano structure attached according to a first embodiment of the present invention.

Referring to FIG. 2, well-conductive electrodes 100 are disposed. Preferably, material with a high conductivity, e.g. Au, Ag, Al, Cu, Ti, and the like, is utilized for the electrodes. On the top portion of the electrodes is a supporter 300, which is also conductive and made of a conductor or coated with a conductor, maintaining a predetermined distance from the electrodes in a horizontal direction. The supporter is usually made of silicon, and to apply the electrodes to this silicon supporter, the supporter can be coated with the metals mentioned above. A holder 400, operating as an electrode, is disposed at a lower portion of the supporter 300, again maintaining a predetermined distance from the electrodes 100. The holder and the supporter can be combined to each other. In such case, silicon is often used to form the shape, and similar to the supporter, the combined body can be coated with a highly conductive metal. A power supply 500 for supplying a voltage to the electrodes 100 and the supporter 300 is connected to one side of the electrode 100 and the supporter 300. A solution 200 in which a rod-shaped nano structure 200-1 is dispersed is dropped in a space between the holder 400 and the electrode 100. At this time, part of or the entire holder 400 should be immersed in the solution. Typically, water, ethanol or isopropanol, cyclohexane where nano structures are well dispersed is preferred as the solution 200.

Based on the above construction, a method for manufacturing a probe having a rod-shaped nano structure attached thereto is now discussed below.

When a voltage is applied to the electrodes 100 and the supporter 300 from the power supply 500, an electric field is generated inside the solution 200, in which the holder 400 on the top surface of the electrodes 100 is immersed. Meanwhile, the rod-shaped nano structure being dispersed in the solution transfers by like as an electrophoretic force and/or a dielectrophoretic force, and is attached to the holder 400. After a predetermined time, or when the solution 200 is evaporated after undergoing a certain process, the rod-shaped nano structure 200-1 is left out, being adhered to the holder 400.

Here, if the distance between the electrodes 100 and the holder 400 is less than the size of the rod-shaped nano structure 200-1, the rod-shaped nano structure 200-1 is more likely to be connected in-between the electrodes 100 and the holder 400. On the other hand, if distance between the electrodes 100 and the holder 400 is relatively greater than the size of the rod-shaped nano structure 200-1, the rod-shaped nano structure is attached only to the electrode 100 or to the supporter 300.

Therefore, the electrodes 100, the holder 400, and the supporter 300 are shifted from one position to another, to adjust the space between the electrode 100 and the holder 400.

Thusly attached nano structure has a strong adhesive force according to kind of material used in a metallic plate. In general, although the nano structure being pulled out to both electrodes by the applied voltage is supported by Van Der Waals force, it has a relatively weak adhesive force. On the contrary, in case of the electrodes like silver, copper or aluminum, n-alkanoic acid [$CH_3(CH_2)_m COOH$] forms a SAM (Self-Assembly Monolayer) on the surfaces of those metals, and when the nano structure is attached to the electrodes, generates not only Van Der Waals force but also a strong chemical bonding ["Structural Comparison of Self-Assembled Monolayers of n-Alkanoic Acids on the Surfaces of Silver, Copper, and Aluminum", J. Am. Chem. Soc. 115, 4350–4358, Yu-Tai Tao, 1993]. As a result, no extra work for attaching the nano structure to the electrode is required. Moreover, at the absence of the adhesion through such chemical bonding, other by-products (or impurities) of the electrical field and nano structures are still bonded together, more strongly than the Van Der Waals force in general. In short, the probe having the nano structure attached thereto by one of the above methods is adhered to the nano structure in a much more strength than the Van Der Waals force that returns from one point of a sample in most cases. Hence, the probe is highly advantageous as a signal detection device.

One of the most persuasive explanations for the attachment of the nano structure to the holder comes from electrophoresis and/or dielectrophoresis. Objects with dipoles have an attraction force by the electric field being generated, and they are attracted to each other, and more particularly, they are attracted to a side with a stronger electric field. According to well-known researches about the electric field generated between an AFM tip and an electrode, intensity of the electric field gets greater as the distance between the AFM tip and the electrode is reduced. It is also known that the sharper the tip is, the stronger the electric field is. Although many believe an ideal tip has a zero radius on its end portion, in reality it has a radius ranging from 10 to 100 nm. Despite the above boundary condition on the tip of the AFM, the electric field is usually strongest on the tip. This explains why the nano structure in the solution is intensively attached to the tip end portion where the electric field is stronger.

Therefore, electric field density is naturally highest at the sharp tip end portion of the AFM. The reason for applying an AC field can be found in the fact that long, slender rod-shaped carbon nanotubes (CNT) are the ones being picked up first, compared to other impurities, primarily because the carbon nanotubes have a large dipole moment. Hence, manufacturing a sharp holder in a protruding fashion, the electric field becomes strongest at the tip end portion and more nano structures are gathered around the tip. This method can be very advantageously used for attaching the carbon nanotube to the sharp tip end like the AFM tip. Normally, when a pure DC is applied, the nano structures as well as impurities are drawn to electrodes, without much difference from each other. This is because the charge being applied to the nano structure has opposite poles, attracting to each other. A study says that if a pure AC is applied, long, slender rod-shaped nanotubes are more attracted to electrodes, compared to the DC [Kunitoshi Yamamoto etc, Orientation and purification of carbon nanotubes using ac electrophoresis, J. Phys. D: Appl. Phys. 31, 1998, L34–L36]. The same phenomenon occurs when a DC biased AC is applied. However, this does not fully explain why the rod-shaped nano structure like CNT approaches between two electrodes in the solution or both sides, so its physical verification and the associated phenomenon need to be researched continuously.

On a different subject, there are many kinds of rod-shaped nano structures. Since the nano structure being discussed in the present invention is not heavily dependent on its structural physical properties but can be implemented easily. Thus nanotubes (e.g. Carbon nanotube, Boron nanotube, BCN type nanotube and the like) as well as nanowires or nano needles having different configurations can also be used since they move in the solution when a voltage is applied thereto [Peter A. Smith etc., electric field assisted assembly and alignment of metallic nanowire, Applied Physics letters, Vo. 77, No. 9, 2000]. This is actually a very significant fact in that those nano structures being attached to the tip of the probe (holder) can be used as sensors or measurement devices.

Figure 3A:
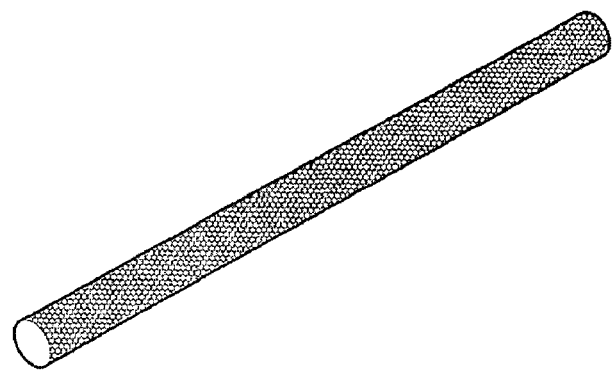
FIG. 3a is a view illustrating a SWNT (Single Wall Nano Tube) which can be used in the present invention.
Figure 3B:
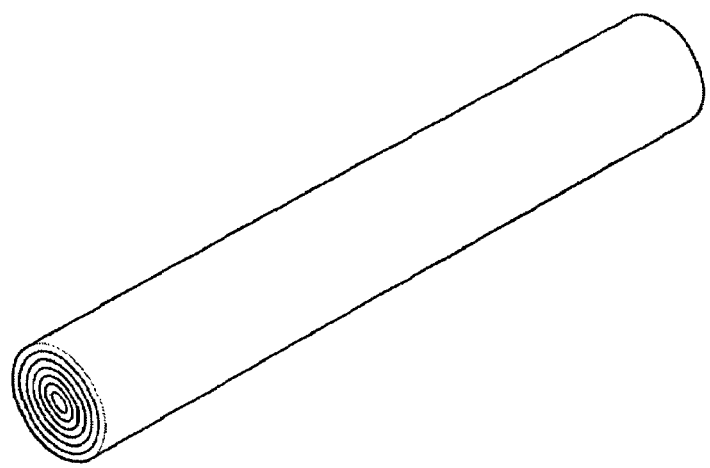
FIG. 3b is a view illustrating a MWNT (Multi Wall Nano Tube) which can be used in the present invention.

FIG. 3 diagrammatically illustrates a carbon nanotube, the typical example of rod-shaped nano structures. Carbon nanotubes (CNT) is first discovered in a cathodic deposit generated by Arc-discharge back in 1991. As the name implies, carbon atoms are bonded together in a tube shape. FIG. 3a depicts a SWNT (Single Wall Nano Tube), wherein carbon atoms are entangled with each other in a single-sheet tube. FIG. 3b, on the other hand, depicts a MWNT (Multi Wall Nano Tube) in a tubular structure with multi-layered sheets. The MWNT has a radius that approximately ranges from several nm to hundreds of nm. On the contrary, the SWNT can be as small as possible such that its radius is less than 1 nm or hundreds of um.

Figure 4:
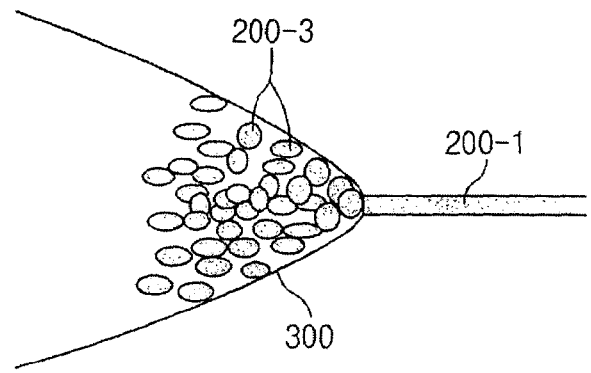
FIG. 4 is a view illustrating a holder to which a rod-shaped nano structure is attached by a fastening means.

FIG. 4 shows that a fastening means can be sometimes used for more firmly attaching the rod-shaped nano structure to the holder. Mainly the fastening means is useful for reinforcing the attachment of the nanotube to the holder by a chemical bonding or for supporting the attachment of the nanotube to the holder by the Van Der Waals force according to an assembly environment as discussed before. For instance, the fastening means can be utilized in case ware environment is easily exposed as in for nano indentation or AFM Lithography. Now referring to FIG. 4, the rod-shaped nano structure 200-1 is attached to the tip of the holder 400, using a similar method with the one described in FIG. 2, and the fastening means causes the already-attached rod-shaped nano structure 200-1 to be more firmly fastened to the holder 400. The inventors prefer using inorganic islands 200-3 as the fastening means, mainly because metals like chrome, aluminum or copper and insulating materials like silicon dioxide are more easily deposited on the holder and the connecting portion of the rod in form of islands, simply with the help of a device like E-beam evaporator, and no separate carbon gas is required in this case.

Meanwhile, in case of using the carbon nanotube as the rod-shaped nano structure and using silicon for the holder and the supporter, as in the present invention, metallic islands on which a metal is deposited are attached to the silicon holder or supporter, not to the carbon nanotube. Taking advantage of this property, it is possible to attach the nanotube to the holder more strongly by forming inorganic islands with a cluster form on the contact portion of the silicon and the carbon nanotube, not on the protruded carbon nanotube.

Besides the above method, general wafer processes, e.g. fusion-welding using electron beams, a CVD (Chemical Vapor Deposition) process or PVD (Physical Vapor Deposition) process, wherein a coating film is attached to the connection portion of the rod-shaped nano structure and the holder, can also be employed, to fasten the rod-shaped nano structure to the holder more firmly.

Figure 5A:
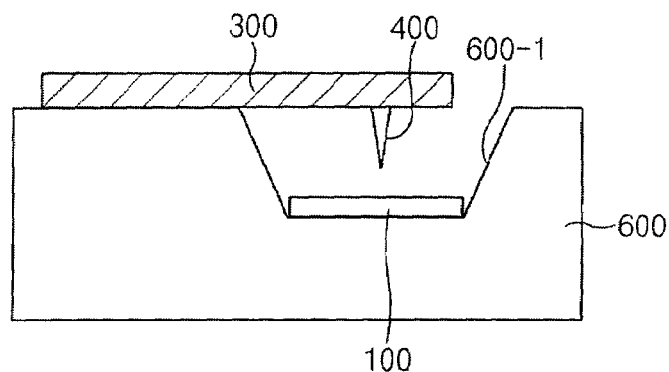
FIGS. 5a to 5c are views for explaining the method for producing a probe with a rod-shaped nano structure attached according to a second embodiment of the present invention.
Figure 5B:
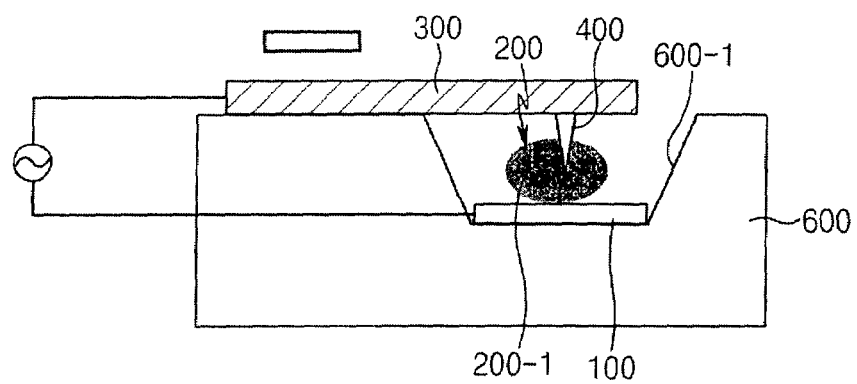
Figure 5C:
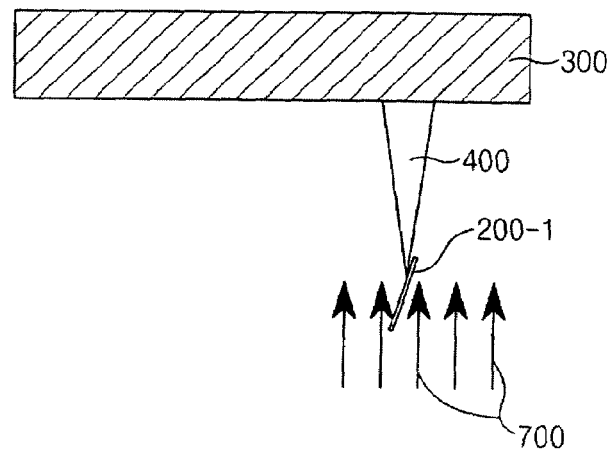

FIGS. 5a to 5c are views for explaining the method for producing a probe with the rod-shaped nano structure attached according to a second embodiment of the present invention.

With reference to the drawings, a substrate 600 having a groove 600-1 is disposed on a central part of a probe, and electrodes 100 are placed on a top surface of the trench 600-1. The electrodes 100 are formed by coating with layers according to a deposition process, and the substrate 600 for forming the trench 600-1 is layered thereon. Here, the trench can be formed using a general etching process. Since the electrodes and the substrate are made of different materials, the electrodes are etched until they are exposed. On the top portion of the electrodes 100 is a supporter 300, which is conductive and made of conductive materials or coated with a conductor, maintaining a predetermined distance from the electrodes in a horizontal direction. A holder 400, acting as an electrode, is disposed at the lower surface of the supporter 300, again maintaining a predetermined distance from the electrodes 100. A power supply 500 for supplying a voltage to the electrodes 100 and the supporter 300 is connected to one side of the electrode 100 and the supporter 300. A solution 200 in which a rod-shaped nano structure 200-1 is dispersed is dropped into a space between the holder 400 and the electrode 100. At this time, part of or the entire holder 400 should be immersed in the solution (see FIG. 5b).

Based on the above construction, a method for manufacturing a probe having a rod-shaped nano structure attached thereto is now discussed below.

When a voltage is applied to the electrodes 100 and the supporter 300 from the power supply 500, an electric field is formed inside the solution 200, in which the holder 400 on the top surface of the electrodes 100 is immersed. Meanwhile, the rod-shaped nano structure being dispersed in the solution transfers in an electrophoretic force or a dielectrophoretic force, and is attached to the holder 400. After a predetermined time, or when the solution 200 is evaporated after undergoing a certain process, the rod-shaped nano structure 200-1 is left out, being adhered to the holder 400.

During the process of FIG. 5b, if the distance between two electrodes 100 is less than the size of the rod-shaped nano structure 200-1, the rod-shaped nano structure 200-1 is more likely to be connected in-between the two electrodes 100. Applying a current and taking advantage of a discharge effect thereof, it is possible to adjust the length of the nano structure being attached to the holder.

As shown in FIG. 5c, in order to fasten the rod-shaped nano structure 200-1 to the holder 400 more strongly, a coating process that involves depositing inorganic material 700, the adhesive medium, on the holder 400, can be additionally performed.

Particularly in the embodiments illustrated in FIGS. 2 and 5, the rod-shaped nano structure attached to the holder is in proportion to the size of the nano structure being dispersed in the solution. When the nano structure being dispersed in the solution goes through a chemical process, the size of the nano structure becomes uniform. Then, the nano structure gets attached to the holder, substantially in a uniform size. Nevertheless, there can be a portion that is more protruded than the tip end portion of the holder, depending on fastening positions. If this happens, the protruded portion of the nano structure can be properly adjusted through a discharge process after all of the process is complete. According to physical properties of nano structures, the amount of voltage to be discharged and the intensity of current are properly adjusted.

FIGS. 6a to 6d are views for explaining the method for producing a probe with a rod-shaped nano structure attached according to a third embodiment of the present invention.

Figure 6A:
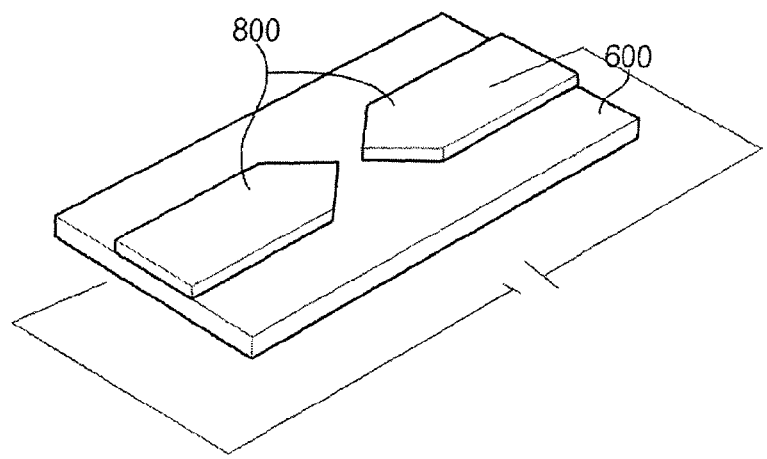
FIGS. 6a to 6d are views for explaining the method for producing a probe with a rod-shaped nano structure attached according to a third embodiment of the present invention.

As depicted in FIG. 6a, a substrate 600 is installed, and a holder 800 composed of two metal electrodes coated with metals are disposed on both sides of a top surface of the substrate, keeping a predetermined distance from the center. As shown in FIG. 6d, a lower end portion (or base end portion) of the holder 800 to be etched is coated with a sacrificial layer in advance, to etch and lift the holder 800 through a Lift-off process.

Figure 6B:
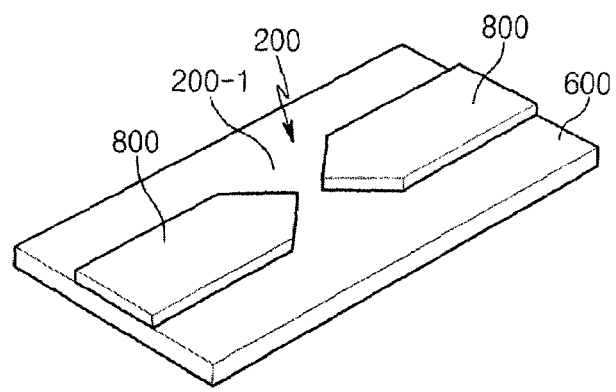

Now turning to FIG. 6b, the solution in which the rod-shaped nano structure 200-1 is dispersed is dropped into between the two electrodes on the substrate 600. At this time, the solution 200 is dropped until adjacent end portions of those two electrodes are immersed into the solution. Then applying a voltage to those two metal electrodes, an electric field is generated between the two electrodes in the solution 200.

When the solution 200 is evaporated after a certain amount of time, the rod-shaped nano structure 200-1, influenced of a charge effect, gets attached to the end portions of the two electrodes, and the two metal electrodes being connected to each other forms the holder 800. Here, if the nano structure is greater than the distance between those two electrodes, those two metal electrodes can be connected to each other. On the other hand, if the nano structure is less than the distance between those two electrodes, the nano structure is connected to only one side of each of the electrodes As discussed before, however, the above process is sufficient to yield an adhesive force that causes a chemical bonding, and a fastening means 700 can be used for obtaining an additional adhesive force, thereby fastening the rod-shaped nano structure 200-1 to the holder 800 more strongly.

Figure 6C:
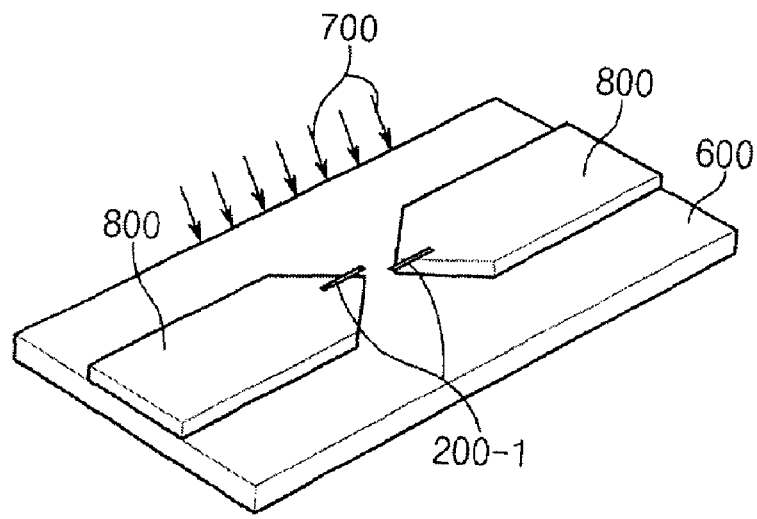
Figure 6D:
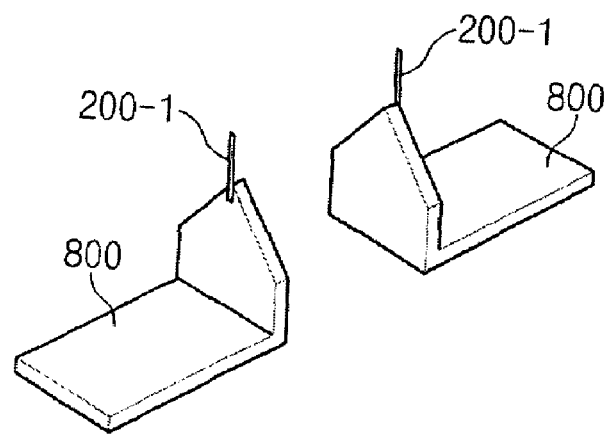

On a different subject, to manufacture a probe having a cantilever like SPM (Scanning Probe Microscope) and the holder in addition to the above construction, as depicted in FIG. 6c, the Lift-off process is applied to part of the two metal electrodes having the rod-shaped nano structure attached thereto, and the holder 800 is lifted off, until the holder has a "L" shape.

Figure 7A:
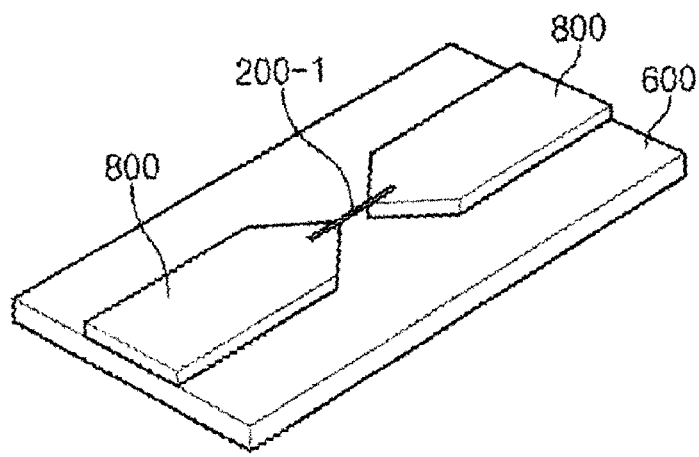
FIGS. 7a to 7c are views for explaining the step to cut a nano structure connected between two electrodes by lithography in the method for producing a probe with a rod-shaped nano structure attached according to the present invention.
Figure 7B:
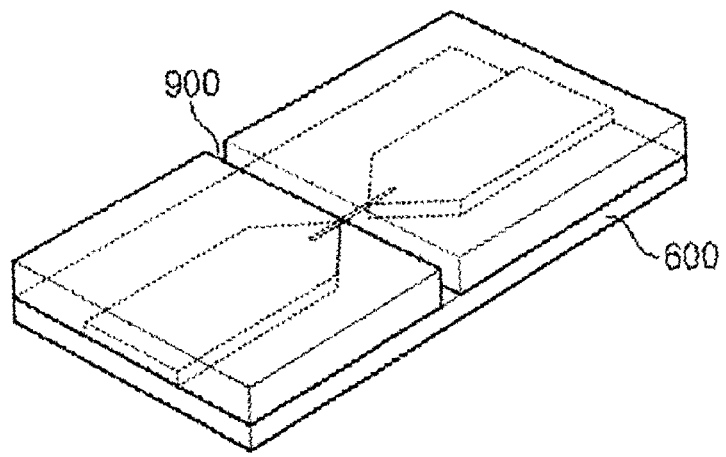
Figure 7C:
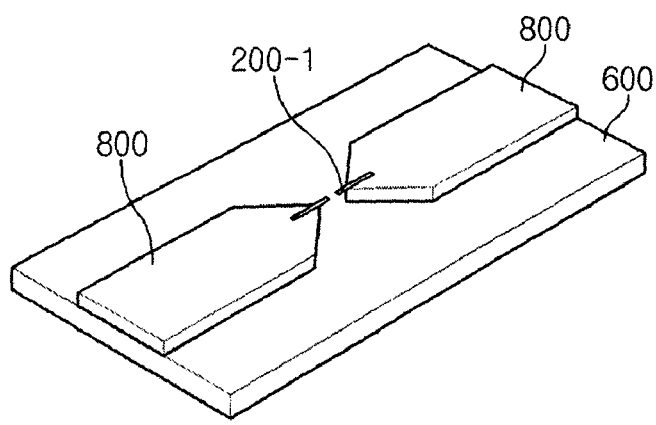

FIGS. 7a to 7c are views for explaining the step to cut a rod-shaped nano structure connected between two metal electrodes being connected to each other by the rod-shaped nano structure obtained from the process shown in FIG. 6c.

The holder 800 in FIG. 7a, namely the two metal electrodes, obtained from the process of FIG. 6c is connected by the rod-shaped nano structure. To cut the rod-shaped nano structure attached to those two metal electrodes, a gap 900 should be made first between the two electrodes, using a lithography process as depicted in FIG. 7c. In this manner, it is possible to adjust a cutting site of the rod-shaped nano structure 200-1, and cut the nano structure as much as needed.

The gap is formed by coating the electrodes with a photoresist, and then etching the photoresist as large as a designated gap.

Afterwards, using the gap 900, the rod-shaped nano structure 200-1 is cut to constant length (see FIG. 7c).

Figure 8:
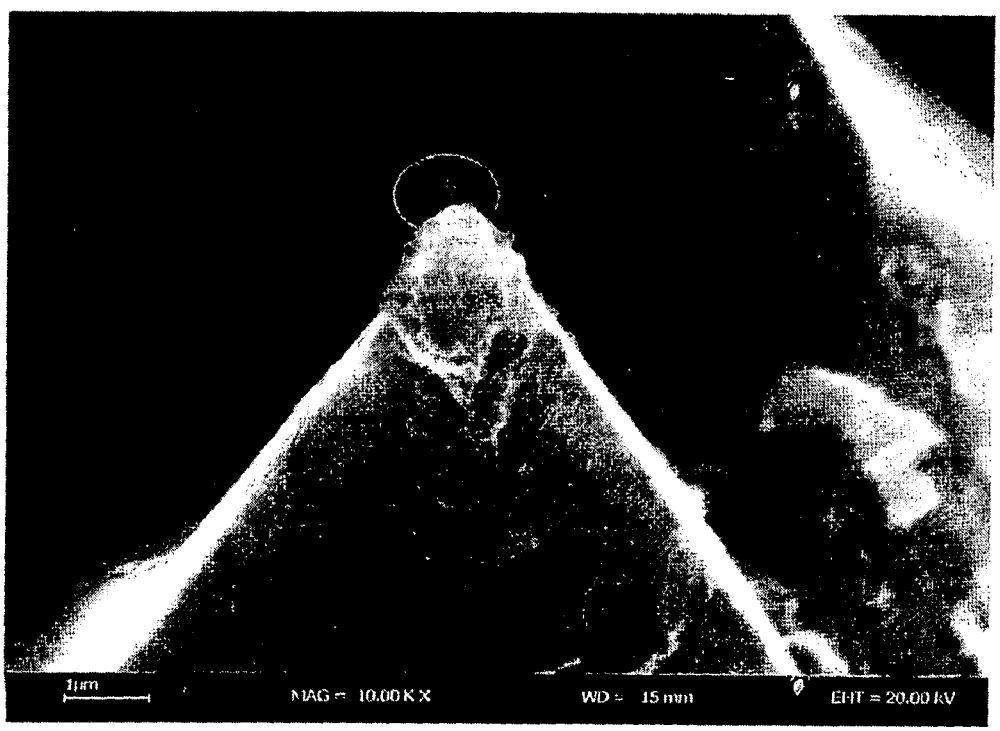
FIG. 8 shows a tip end of a probe to which a multi wall carbon nanotube is attached according to an embodiment of the present invention.

FIG. 8, similar to the embodiment suggested in FIG. 3, one electrode plate is placed at the base portion, and using an AFM tip coated with metal to cause a current to be applied thereto, the two electrodes are arranged in such a manner that the distance between them is under 10 micrometers. After this, a solution containing MultiWall Nanotube (40% purified sample produced by ILJINnanotech Co.) is dropped into the gap, and a 7-volt, 5 MHz AC is applied thereto. The pyramidically tapered protruded portion in the circle is a Multi wal CNT. The CNT together with other impurities are drawn to the AFM tip end portion, and eventually attached thereto. At this time, a metal coating (film) can be attached to the AFM tip end by applying one of AC, DC or biased AC.

As described in detail above, the present invention relates to a method for attaching a rod-shaped nano structure to a pyramidically tapered holder by applying an electric field, and introduces a new structure of a probe for detecting electrical/mechanical signals. According to the present invention, without using a separate device, the rod-shaped nano structure can be directly attached to an electrode with a high possibility. In addition, the method of the present invention, compared to other related art methods, is very simple and appropriate for mass productions. Further, since the present invention can be implemented using a wafer process, expense of manufacture of sensors or detection devices to be manufactured by a batch process can be substantially reduced.

In conclusion, the present invention is related to a method for attaching a rod-shaped nano structure to a holder and a probe using the same, to attach the nano structure to a protruded portion of the holder in a protruding fashion. Attaching the nano structure to a SPM probe holder in this manner, high-resolution images can be obtained since the nano structure has a high aspect ratio and the tip end has an extremely small radius. When this probe needle is used for data storage, even more microscope signals can be detected. Millepde of IBM, i.e. an AFM tip having carbon nanotube attached thereto, for example, demonstrates relatively superior read/write performances to those of general Si tips (Bernd Gotsmann etc., "nano-indentation with heated tips: playing with temperature, time, load, tip shape, and polymer material", Oxford 2003 SPM conference). In case of applying a nano structure with an excellent ware property, say, carbon nanotubes, to a lithography process using SPM, failure rate is pretty low, meaning that manufacturing work can be done for a long time without an interruption. Moreover, a probe having this nano structure attached thereto is regarded as an ideal device for detecting DNA or protein signals or an ideal sensor for interacting with samples, specific DNAs or proteins, taking advantage of specific physical properties of the nano structure (e.g. carbon nanotubes). The probe can also be employed as a sensor for measuring diverse chemical environments or chemical element including air, vacuum, $NH_3$ and the like. In recent years, as many mass production methods of nanotubes, nano needles, or nano wires at a low expense of manufacture appeared, it became possible to purchase raw material as a low price. In other words, applying the method of the present invention to the manufacture of a probe tip, a probe being attached with a low-price nano structure can be manufactured. Especially, the present invention can be advantageously used for a probe tip in devices like STM, AFM, and SNOM with a long lifespan and a high resolution.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for manufacturing a probe for signal detection having a rod-shaped nano structure attached thereto, the method comprising the steps of:

disposing an electrode, and disposing one end of a holder to a supporter such that the holder protrudes towards the electrode wherein a predetermined distance remains between the end of the holder and the electrode;

supplying a solution between the holder and the electrode at a second predetermined distance, such that space between the holder and the electrode is filled with the solution, wherein a rod-shaped nano structure is dispersed in the solution; and applying a voltage including alternating current (AC) voltage to the holder and the electrode such that the rod-shaped nano structure is attached to the the end of the holder by dielectrophoretic force caused by a non-uniform electric force formed between the holder and the electrode; and evaporating the solution while maintaining the predetermined distance between the electrode and the end of the holder.

2. The method according to claim 1, further comprising the step of:

depositing chemical material on the holder to reinforce the attachment of the nano structure to the holder by a chemical bond.

3. The method according to claim 1, further comprising the step of:

adjusting the length of a part of the nano structure that protrudes past an end portion of the holder by applying a discharge process to the nano structure attached to the holder after the nano structure is attached to the holder.

4. The method according to claim 1, further comprising the step of:

after the attaching step, fastening the nano structure to the holder more firmly by of a fastening means.

5. The method according to claim 4, wherein the fastening means is formed by depositing an inorganic material on a connection part of the holder and the rod-shaped nano structure, wherein the inorganic material comprises a material selected from the group consisting of chrome, aluminum and silicon dioxide.

6. The method according to claim 5, wherein the inorganic material is formed in a cluster of islands.

7. The method according to claim 4, wherein the fastening means is formed by attaching a coating film to a connection portion of the rod-shaped nano structure and the holder.

8. The method according to claim 4, wherein the fastening means is formed by fusion-welding a connection portion of the rod-shaped structure and the holder on a SEM (Scanning Electron microscope).

9. The method according to claim 1, wherein the holder and supporter are replaced with a sharpened end of an atomic force microscope (AFM) tip that acts as an electrode to which the rod-shaped nano structure is attached.

* * * * *